(12) United States Patent
Jang et al.

(10) Patent No.: US 12,424,725 B2
(45) Date of Patent: Sep. 23, 2025

(54) ELECTRONIC DEVICE INCLUDING ANTENNA

(71) Applicant: SAMSUNG ELECTRONICS CO., LTD., Suwon-si (KR)

(72) Inventors: Sooyoung Jang, Suwon-si (KR); Yoonjung Kim, Suwon-si (KR); Gyubok Park, Suwon-si (KR); Dongryul Shin, Suwon-si (KR); Donghun Shin, Suwon-si (KR); Hoonsang Yoo, Suwon-si (KR); Minkyung Lee, Suwon-si (KR); Huiwon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 252 days.

(21) Appl. No.: 17/976,449

(22) Filed: Oct. 28, 2022

(65) Prior Publication Data
US 2023/0112380 A1 Apr. 13, 2023

Related U.S. Application Data

(63) Continuation of application No. PCT/KR2022/014627, filed on Sep. 29, 2022.

(30) Foreign Application Priority Data

Oct. 13, 2021 (KR) .................. 10-2021-0135690

(51) Int. Cl.
H01Q 1/02 (2006.01)
H01Q 1/24 (2006.01)

(52) U.S. Cl.
CPC ............. *H01Q 1/02* (2013.01); *H01Q 1/241* (2013.01)

(58) Field of Classification Search
CPC H01Q 1/02; H01Q 1/241; H01Q 1/24; H01Q 1/243
See application file for complete search history.

(56) References Cited

U.S. PATENT DOCUMENTS 9,531,059 B2   12/2016   Iellici et al.
10,069,196 B1   9/2018   Yen et al.
(Continued)

FOREIGN PATENT DOCUMENTS

KR   10-0663490   12/2006
KR   10-2012-0049056   5/2012
(Continued)

OTHER PUBLICATIONS

Search Report dated Jan. 6, 2023 in International Patent Application No. PCT/KR2022/014627.
(Continued)

*Primary Examiner* — Dieu Hien T Duong
(74) *Attorney, Agent, or Firm* — Nixon & Vanderhye, P.C.

(57) ABSTRACT

An example electronic device including an antenna includes a housing including a first conductive portion, a first support member disposed inside the housing, a printed circuit board disposed on one surface of the first support member and including a wireless communication module, an electronic component electrically connected to the printed circuit board, and a conductive plate supporting the electronic component. The conductive plate is constituted such that a first portion is electrically connected to the wireless communication module and a second portion is electrically connected to the first conductive portion, and thereby broadband radiation characteristics can be provided.

18 Claims, 17 Drawing Sheets

(56) References Cited

U.S. PATENT DOCUMENTS

| | | | |
|---|---|---|---|
| 10,249,957 | B2 | 4/2019 | Chang et al. |
| 10,862,216 | B1 | 12/2020 | Ayala Vazquez et al. |
| 11,769,946 | B2 | 9/2023 | Kim et al. |
| 2007/0123294 | A1 | 5/2007 | Lee |
| 2014/0292589 | A1 | 10/2014 | Park et al. |
| 2016/0064820 | A1 | 3/2016 | Kim et al. |
| 2016/0301442 | A1* | 10/2016 | Sohn .................. H05K 9/0032 |
| 2018/0358993 | A1* | 12/2018 | Kang .................. G06F 1/1656 |
| 2019/0067795 | A1 | 2/2019 | Shin et al. |
| 2020/0161763 | A1 | 5/2020 | Lee et al. |
| 2020/0267847 | A1 | 8/2020 | Lee et al. |
| 2020/0404808 | A1 | 12/2020 | Kim et al. |
| 2021/0044681 | A1 | 2/2021 | Park et al. |
| 2021/0135378 | A1 | 5/2021 | Cho et al. |

FOREIGN PATENT DOCUMENTS

| | | |
|---|---|---|
| KR | 10-2002874 | 7/2019 |
| KR | 10-2019-0096593 | 8/2019 |
| KR | 10-2019-0106187 | 9/2019 |
| KR | 10-2056173 | 12/2019 |
| KR | 10-2020-0101178 | 8/2020 |
| KR | 10-2226173 | 3/2021 |
| KR | 10-2021-0092611 | 7/2021 |

OTHER PUBLICATIONS

Written Opinion dated Jan. 6, 2023 in International Patent Application No. PCT/KR2022/014627.
Extended Search Report dated Dec. 6, 2024 in European Patent Application No. 22881260.8.

* cited by examiner

ELECTRONIC DEVICE INCLUDING ANTENNA

CROSS-REFERENCE TO RELATED APPLICATIONS

This application is a continuation of International Application No. PCT/KR2022/014627 designating the United States, filed on Sep. 29, 2022, in the Korean Intellectual Property Receiving Office and claiming priority to Korean Patent Application No. 10-2021-0135690, filed on Oct. 13, 2021, in the Korean Intellectual Property Office, the disclosures of which are incorporated by reference herein in their entireties.

BACKGROUND

Field

The disclosure relates to an electronic device including at least one antenna.

Description of Related Art

The use of an electronic device such as a smart phone of a bar type, a foldable type, a rollable type or a sliding type, or a tablet PC is increasing, and various functions are provided to the electronic device.

The electronic device may transmit and receive a phone call and various data with another electronic device through wireless communication.

In order to perform wireless communication with another electronic device using a network, the electronic device may include at least one antenna.

SUMMARY

As the thickness of the electronic device becomes thinner, at least a portion of a housing forming the exterior of the electronic device may be formed of a conductive material (e.g., metal) and used as an antenna (e.g., antenna radiator) for performing wireless communication.

For example, the housing of the electronic device may use, as at least one antenna, conductive portions separated through at least one segmenting part (e.g., a slit).

The electronic device may include a laser direct structuring (LDS) antenna to implement a multiple input and multiple output (MIMO) antenna inside the housing. When the LDS antenna is disposed inside the housing, there may be a limit in reducing the thickness of the electronic device, and a space for placing electronic components may be reduced.

Various embodiments of the disclosure may use a conductive plate supporting an electronic component (e.g., a speaker module) as a first antenna radiator and use a portion (e.g., a conductive portion) of a housing (e.g., a side member) as a second antenna radiator, thereby providing an electronic device including an antenna having broadband radiation characteristics.

The technical problems to be resolved by various embodiments of the disclosure are not limited to the above-mentioned problems, and other technical benefits not mentioned herein will be appreciated from the following description.

An electronic device according to various example embodiments of the disclosure may include: a housing including a first conductive portion, a first support member disposed inside the housing, a printed circuit board disposed on one surface of the first support member and including a wireless communication module, an electronic component electrically connected to the printed circuit board, and a conductive plate supporting the electronic component, the conductive plate being configured such that a first portion is electrically connected to the wireless communication module and a second portion is electrically connected to the first conductive portion.

An electronic device according to various embodiments of the disclosure may include: a housing, a printed circuit board disposed inside the housing and including a wireless communication module, an electronic component electrically connected to the printed circuit board, and a conductive plate supporting the electronic component, the conductive plate being configured such that a first portion is electrically connected to the wireless communication module.

According to various example embodiments of the disclosure, an electronic device having broadband radiation characteristics is provided using, as a first antenna radiator, a conductive plate supporting an electronic component (e.g., a speaker module) electrically connected to a wireless communication module and/or a processor and using, as a second antenna radiator, a portion (e.g., a conductive portion) of a housing (e.g., a side member) electrically connected to the conductive plate.

In addition, various effects will be explicitly or implicitly provided in the disclosure.

BRIEF DESCRIPTION OF THE DRAWINGS

In connection with the description of the drawings, the same or similar reference numerals may be used for the same or similar components.

The above and other aspects, features and advantages of certain embodiments of the present disclosure will be more apparent from the following detailed description, taken in conjunction with the accompanying drawings, in which.

DETAILED DESCRIPTION

Figure 1:
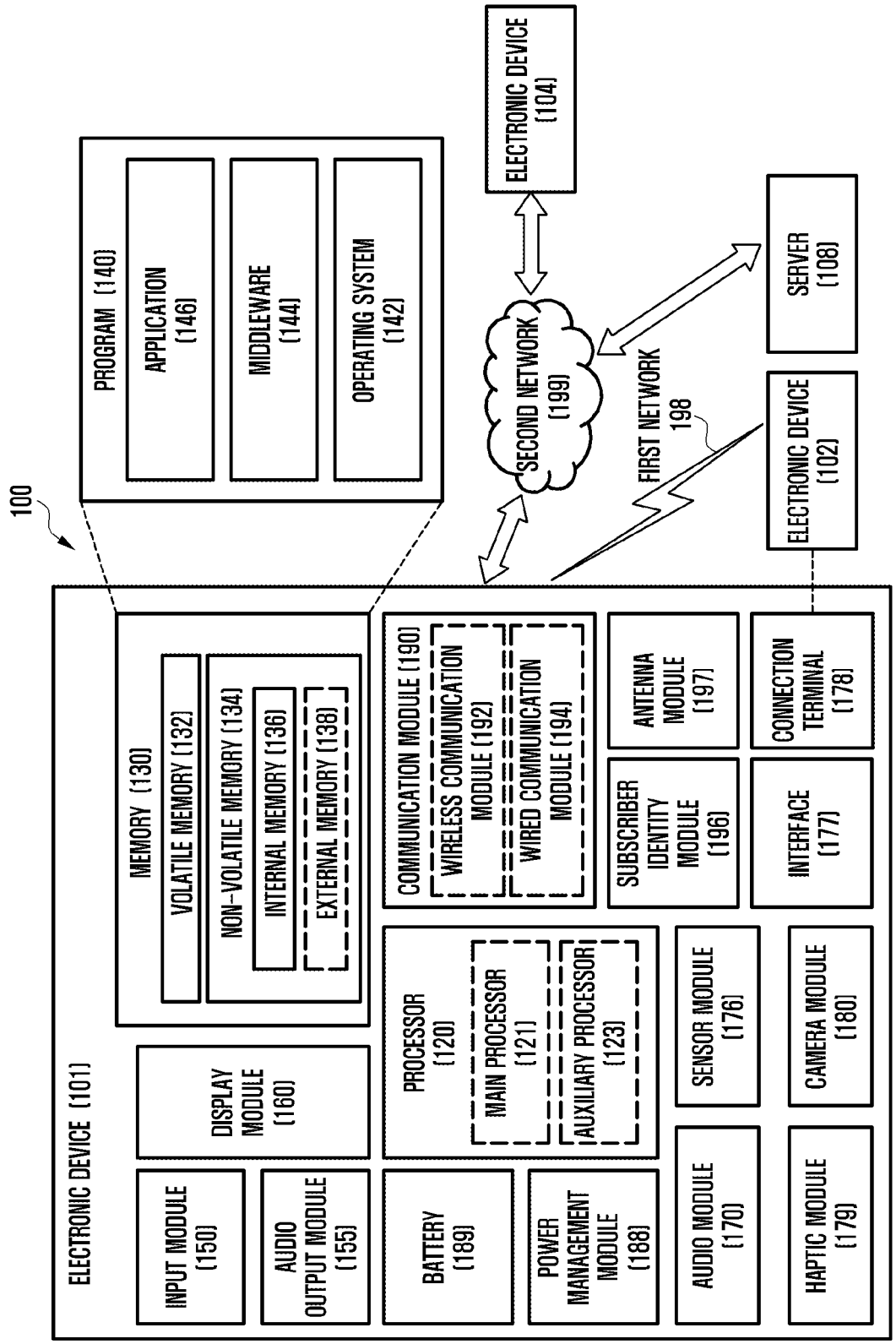
FIG. 1 is a block diagram illustrating an example electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, an audio output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2A:
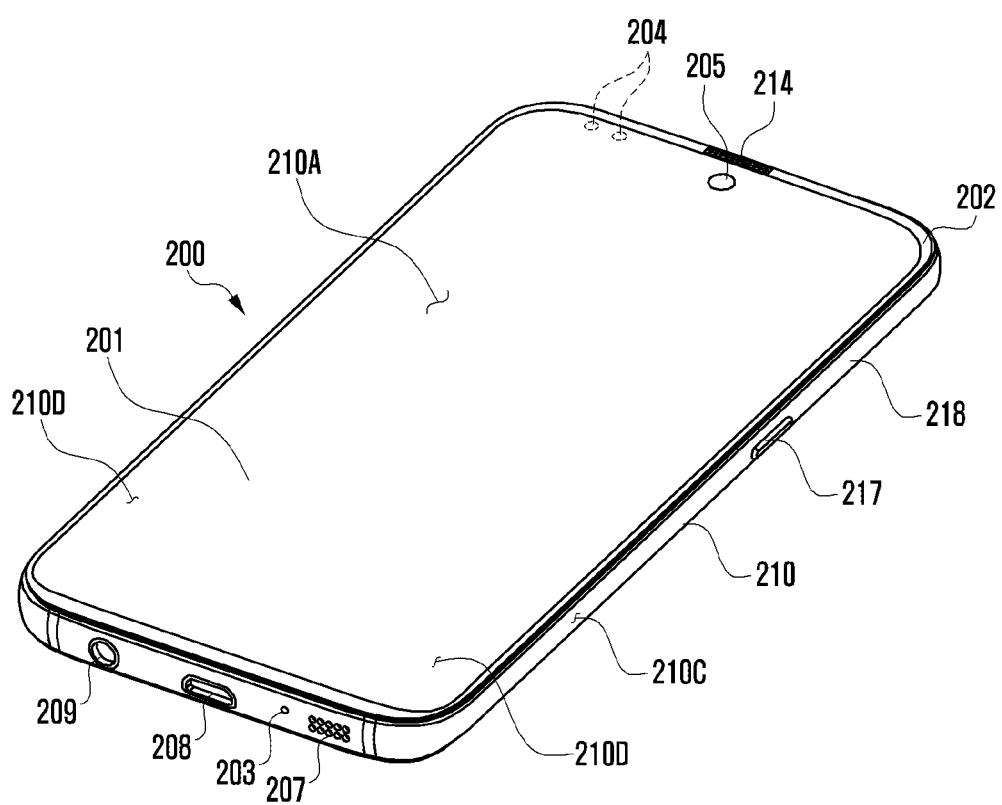
FIG. 2A is a perspective diagram illustrating a front surface of an example electronic device according to various embodiments.
Figure 2B:
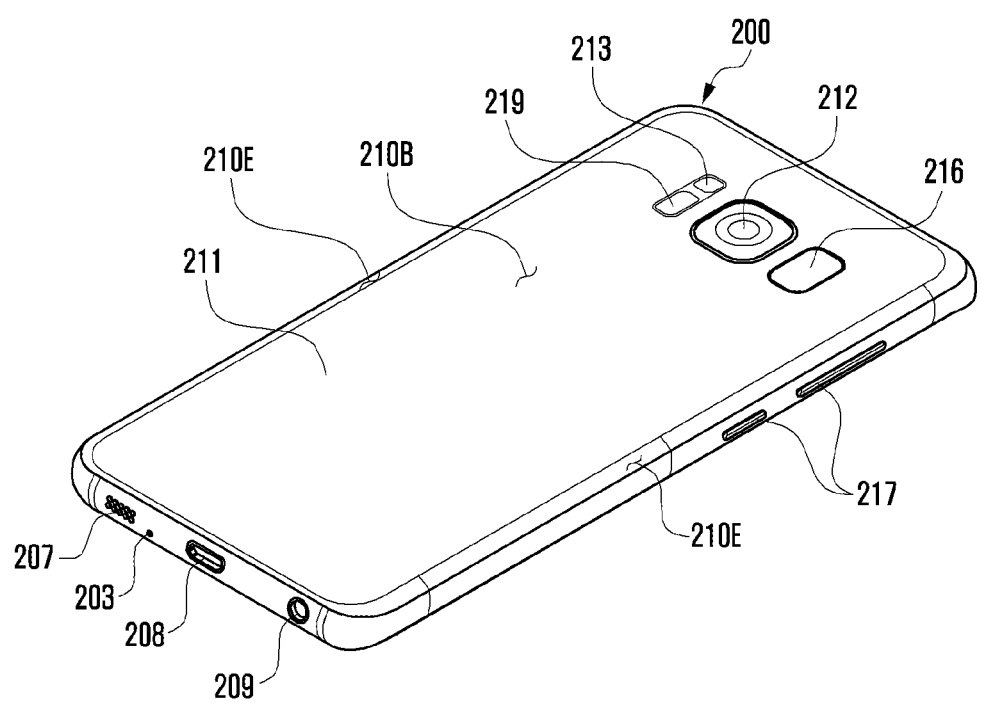
FIG. 2B is a perspective diagram illustrating a rear surface of an example electronic device according to various embodiments.

FIG. 2A is a front perspective view of an example electronic device according to various embodiments. FIG. 2B is a rear perspective view of the example electronic device according to various embodiments.

Referring to FIG. 2A and FIG. 2B, an electronic device 200 according to an embodiment may include a housing 210 including a first surface (or front surface) 210A, a second surface (or rear surface) 210B, and a side surface 210C surrounding the space between the first surface 210A and the second surface 210B. In an embodiment (not illustrated), the housing may denote a structure that forms a part of the first surface 210A, the second surface 210B, and the side surface 210C illustrated in FIG. 2A and FIG. 2B. According to an embodiment, the first surface 210A may be formed by a front plate 202, at least a part of which is substantially transparent (for example, a glass plate including various coating layers, or a polymer plate). The second surface 210B may be formed by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In various embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In various embodiments, the front plate 202 (or the rear plate 211) may include only one of the first areas 210D (or the second areas 210E). In an embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to an embodiment, the electronic device 200 may include at least one of a display 201, audio modules 203, 207, and 214, sensor modules 204 and 219, camera modules 205, 212, and 213, a key input device 217, indicator, and connector holes 208 and 209. In various embodiments, at least one of the constituent elements (for example, the key input device 217 or indicator) of the electronic device 200 may be omitted, or the electronic device 200 may additionally include another constituent element(s).

The display 201 may be exposed through a corresponding part of the front plate 202, for example. In various embodiments, at least a part of the display 201 may be exposed through the front plate 202 that forms the first areas 210D of the side surface 210C and the first surface 210A. In various embodiments, the display 201 may have a corner formed in substantially the same shape as that of the adjacent outer periphery of the front plate 202. In an embodiment (not illustrated), in order to increase the area of exposure of the display 201, the interval between the outer periphery of the display 201 and the outer periphery of the front plate 202 may be formed to be substantially identical.

The audio modules may include a microphone hole 203 and speaker holes 207 and 214. A microphone for acquiring an external sound may be arranged in the microphone hole 203, and a plurality of microphones may be arranged therein such that the direction of a sound can be sensed in various embodiments. The speaker holes 207 and 214 may include an outer speaker hole 207 and a speech receiver hole 214. In various embodiments, the speaker holes 207 and 214 and the microphone hole 203 may be implemented as a single hole, or a speaker may be included (for example, a piezoelectric speaker) without the speaker holes 207 and 214.

The sensor modules 204, 216, and 219 may generate an electric signal or a data value corresponding to the internal operating condition of the electronic device 200 or the external environment condition thereof. The sensor modules 204, 216, and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, a heart rate monitor (HRM) sensor) arranged on the second surface 210B of the housing 210, and/or a fourth sensor module 216 (for example, a fingerprint sensor). The fingerprint sensor may be arranged not only on the first surface 210A (for example, the display 201) of the housing 210, but also on the second surface 210B thereof. The electronic device 200 may further include other unillustrated sensor modules, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor.

The camera modules 205, 212, and 213 may include a first camera device 205 arranged on the first surface 210A of the electronic device 200, a second camera device 212 arranged on the second surface 210B thereof, and/or a flash 213. The camera devices 205 and 212 may include a single lens or a plurality of lenses, an image sensor, and/or an image signal processor. The flash 213 may include, for example, a light-emitting diode or a xenon lamp. In various embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In an embodiment, the electronic device 200 may not include a part of the above-mentioned key input device 217 or the entire key input device 217, and the key input device 217 (not included) may be implemented as another type, such as a soft key, on the display 201. In various embodiments, the key input device may include a sensor module 216 arranged on the second surface 210B of the housing 210.

The indicator may be arranged on the first surface 210A of the housing 210, for example. The indicator may provide information regarding the condition of the electronic device 200 in a light type, for example. In an embodiment, the indicator may provide a light source that interworks with operation of the camera module 205, for example. The indicator may include, for example, an LED, an IR LED, and a xenon lamp.

The connector holes 208 and 209 may include a first connector hole 208 capable of containing a connector (for example, a USB connector) for transmitting/receiving power and/or data to/from an external electronic device, and/or a second connector hole (for example, an earphone jack) 209 capable of containing a connector for transmitting/receiving an audio signal to/from the external electronic device.

In an embodiment (not illustrated), a recess or an opening may be formed in a part of the screen display area of the display 201, and at least one of an audio module 214, a sensor module 204, a camera module 205, and a light-emitting element 206 may be included and aligned with the recess or the opening. In an embodiment (not illustrated), on the back surface of the screen display area of the display 201, at least one of an audio module 214, a sensor module 204, a camera module 205, a fingerprint sensor 216, and a light-emitting element 206 may be included. In an embodiment (not illustrated), the display 201 may be coupled to or arranged adjacent to a touch sensing circuit, a pressure sensor capable of measuring the intensity (pressure) of a touch, and/or a digitizer that detects a magnetic field-type stylus pen. In some embodiments, at least a part of the sensor modules 204 and 219 and/or at least a part of the key input device 217 may be arranged in the first areas 210D and/or the second areas 210E.

Figure 3:
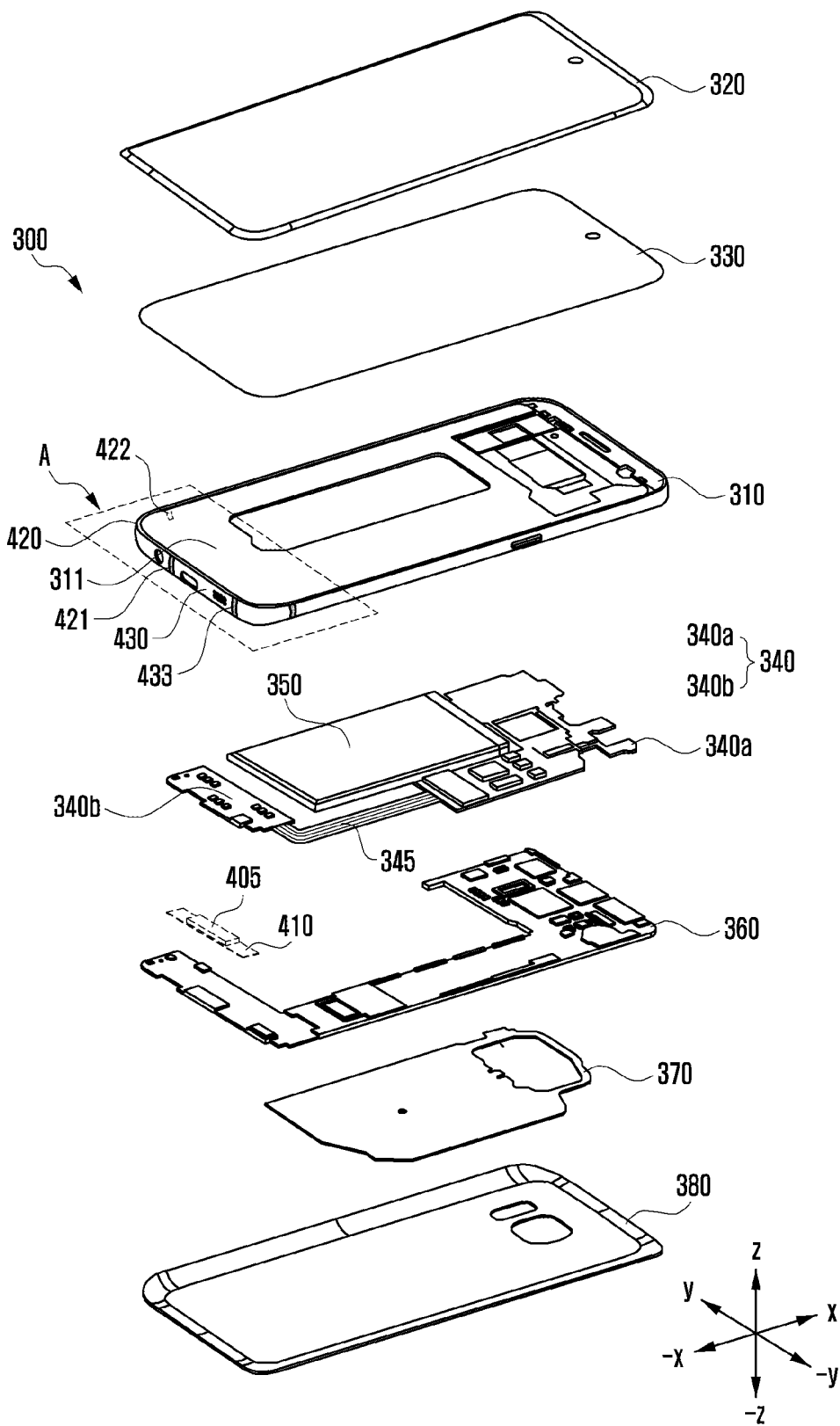
FIG. 3 is an exploded perspective diagram illustrating an example electronic device according to various embodiments.

FIG. 3 is an exploded perspective view of an example electronic device according to various embodiments.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In various embodiments, at least one of the constituent elements (for example, the first support member 311 or the second support member 360) of the electronic device 300 may be omitted, or the electronic device 300 may further include another constituent element(s). At least one of the constituent elements of the electronic device 300 may be identical or similar to at least one of the constituent elements of the electronic device 101 or 200 of FIG. 1, FIG. 2A, and FIG. 2B, and descriptions thereof will not be repeated here.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

According to various embodiments, at least a portion of the printed circuit board 340 may be located in a first direction (e.g., upper side) and/or a second direction (e.g., lower side) of the electronic device 300. The printed circuit board 340 may include, for example, a structure in which a plurality of printed circuit boards (PCBs) are stacked. For example, the printed circuit board 340 may include an interposer structure. The printed circuit board 340 may be implemented in the form of a flexible printed circuit board (FPCB) and/or the form of a rigid printed circuit board (PCB). The printed circuit board 340 provided in the first direction (e.g., upper side) and the second direction (e.g., lower side) may be electrically connected through a signal connection member 345 (e.g., a coaxial cable or an FPCB).

According to various embodiments, the printed circuit board (PCB) 340 may include a first PCB 340*a* and/or a second PCB 340*b*. For example, the first PCB 340*a* and the second PCB 340*b* may be disposed to be spaced apart from each other, and may be electrically connected using a connection member 345 (e.g., a coaxial cable and/or FPCB).

The memory may include a volatile memory or a nonvolatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In an embodiment, an antenna structure may be formed by a part or a combination of the side bezel structure 310 and/or the first support member 311.

According to an embodiment, an electronic component 405 (e.g., a speaker module) may be disposed between the first support member 311 (e.g., a bracket) and the second support member 360 (e.g., a rear case). The electronic component 405 may be disposed on one side of the second PCB 340*b*. The electronic component 405 may be electrically connected to the second PCB 340*b*. The electronic component 405 (e.g., the speaker module) may be supported by a conductive plate 410 disposed in one direction (e.g., the negative z-axis direction). The conductive plate 410 may be electrically connected to the second PCB 340*b*. The conductive plate 410 may be electrically connected to the processor 120 and/or the wireless communication module 192 illustrated in FIG. 1, and may operate as a first antenna radiator. In an embodiment, the processor 120 and/or the wireless communication module 192 illustrated in FIG. 1 may be disposed on the first PCB 340*a*.

According to an embodiment, the side member 310 (e.g., a housing) may form at least a portion of the exterior of the electronic device 300. The side member 310 may include a first conductive portion 420 physically separated by a first segmenting part 421 and a second segmenting part 422. In an embodiment, the side member 310 may include a second conductive portion 430 physically separated by the first segmenting part 421 and a third segmenting part 433.

According to various embodiments, the side member 310 of the electronic device 300 is not limited to the aforementioned conductive portions 420 and 430, and may include more conductive portions depending on the number of segmenting parts.

According to various embodiments, the conductive plate 410 (e.g., the first antenna radiator) that supports the electronic component 405 (e.g., the speaker module) may be electrically connected, using a conductive connecting member (e.g., a screw), to the first conductive portion 420 formed in the side member 310. For example, the first conductive portion 420 may operate as a second antenna radiator.

According to various embodiments, the electronic component 405 (e.g., the speaker module) and the conductive plate 410 may be connected using a conductive connecting member (e.g., a screw) with the second support member 360 interposed therebetween. In an embodiment, the conductive plate 410 is disposed on a first surface of the second support member 360 in one direction (e.g., the negative z-axis direction), the electronic component 405 is disposed on a second surface of the second support member 360 in a direction (e.g., the z-axis direction) opposite to the one direction (e.g., the negative z-axis direction), and they may be connected using the conductive connecting member (e.g., the screw).

Figure 4A:
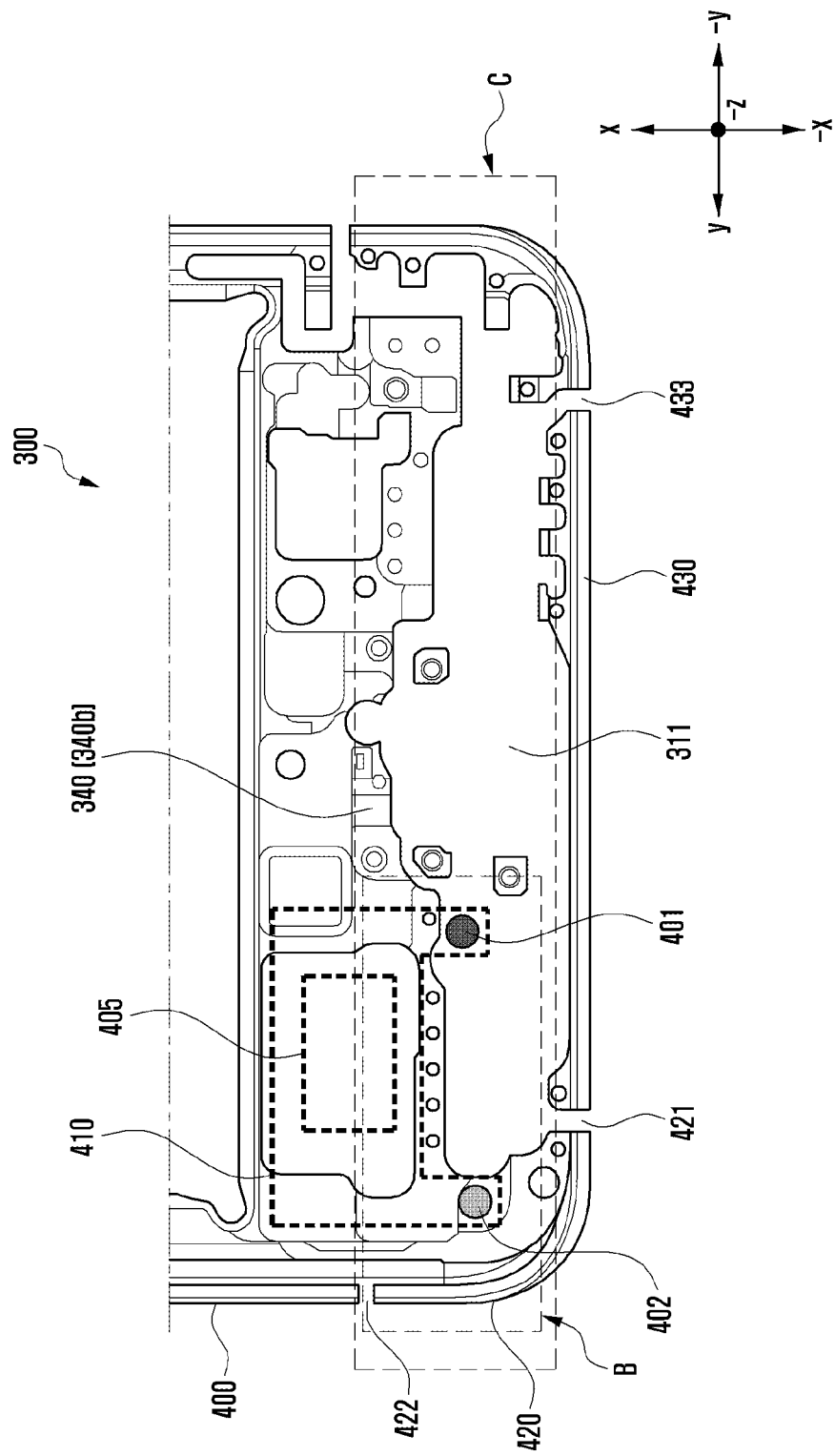
FIG. 4A is a diagram schematically illustrating an embodiment of a part A in a state in which the housing, the electronic components, and the conductive plate are combined with each other in the example electronic device illustrated in FIG. 3 according to various embodiments.
Figure 4B:
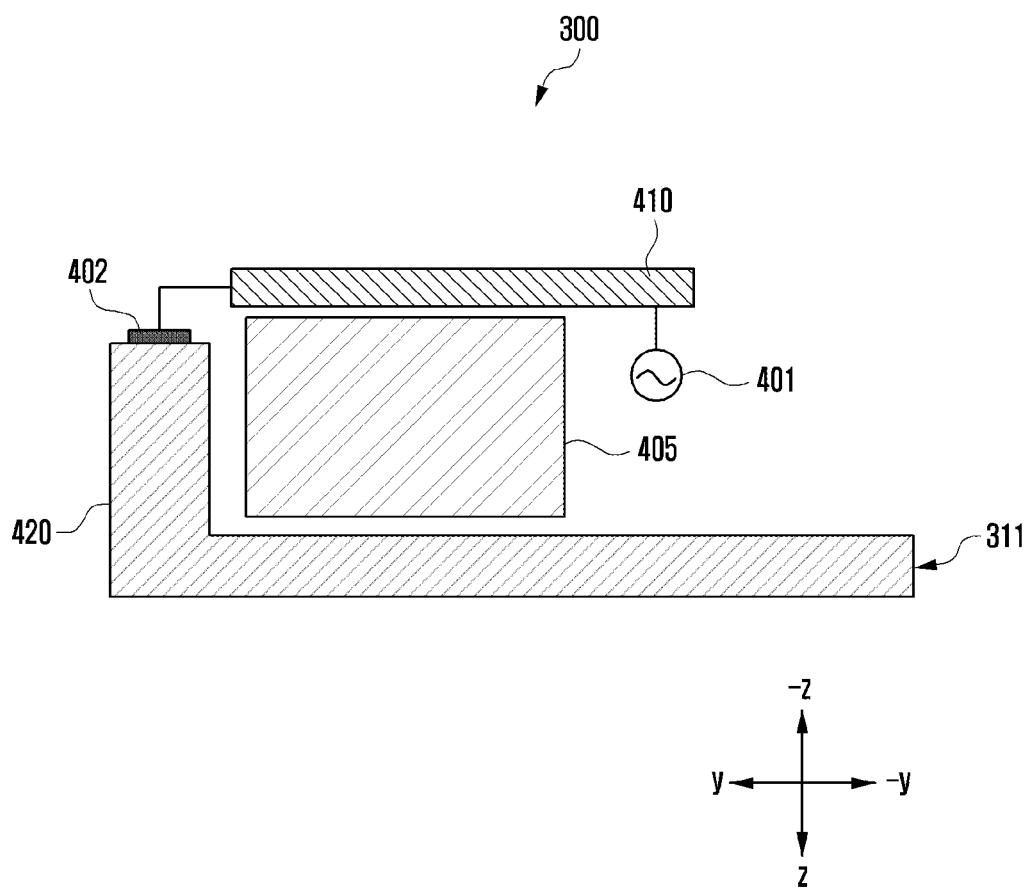
FIG. 4B is a diagram schematically illustrating a cross-section of a part B of the example electronic device illustrated in FIG. 4A according to various embodiments.
Figure 4C:
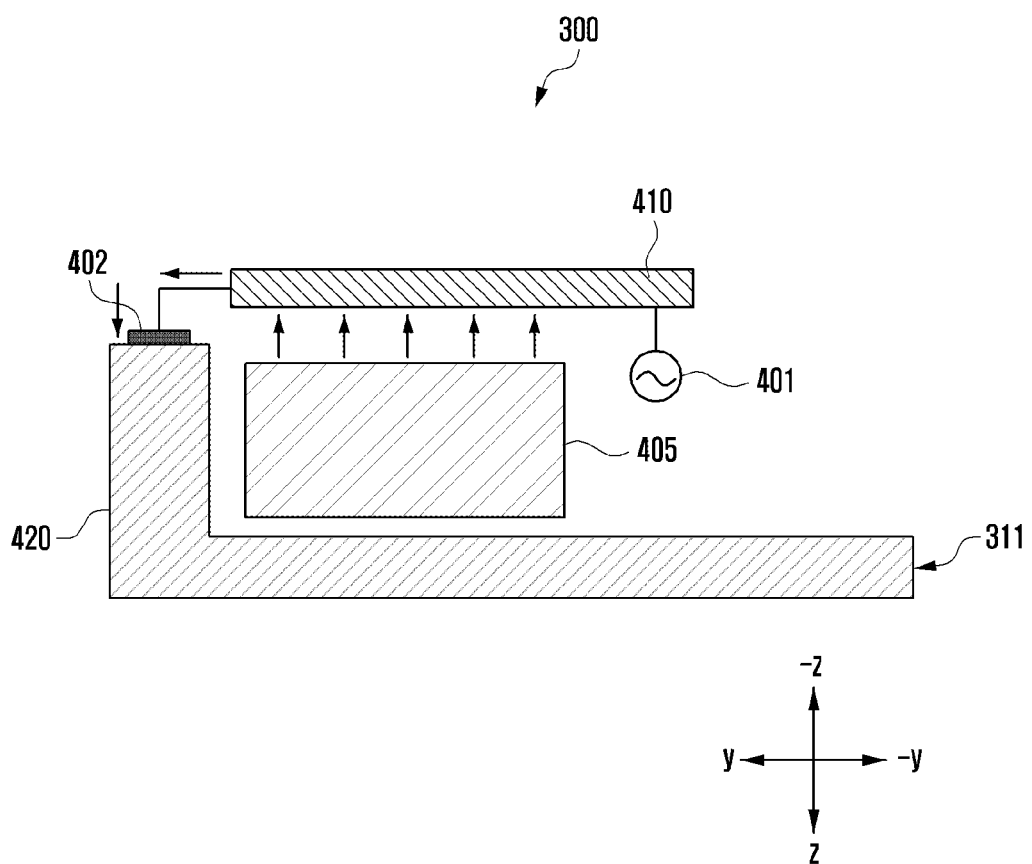
FIG. 4C is a diagram illustrating that heat generated from an example electronic component of an electronic device is diffused into a housing according to various embodiments.

FIG. 4A is a diagram schematically illustrating an embodiment of a part A in a state in which the housing, the electronic components, and the conductive plate are combined with each other in the example electronic device illustrated in FIG. 3 according to various embodiments. FIG. 4B is a diagram schematically illustrating a cross-section of a part B of the example electronic device illustrated in FIG. 4A according to various embodiments. FIG. 4C is a diagram illustrating that heat generated from an electronic component of an example electronic device is diffused into a housing according to various embodiments.

According to an embodiment, FIG. 4A is a diagram, viewed from one direction (e.g., the negative z-axis direction), of the part A in a state in which the housing, electronic component, and conductive plate of the electronic device shown in FIG. 3 are combined. FIGS. 4B and 4C are schematic views illustrating the part B of the electronic device shown in FIG. 4A.

The electronic device 300 of FIGS. 4A, 4B, and 4C may include the above-described embodiments regarding the electronic device 101 of FIG. 1, the electronic device 200 of FIGS. 2A and 2B, and/or the electronic device 300 of FIG. 3. In the description of FIGS. 4A, 4B, and 4C, the same reference numerals are assigned to components substantially identical with those of the electronic device 300 illustrated in FIG. 3, and descriptions are not repeated.

Although the following embodiment related to the electronic device 300 uses, for example, a bar-type electronic device for description, the disclosure is not limited thereto. The embodiment may also be applied to an electronic device such as a foldable type, a rollable type, a sliding type, a wearable type, a tablet PC, or a notebook PC.

With reference to FIGS. 4A, 4B, and 4C, the electronic device 300 according to various embodiments of the disclosure may include the electronic component 405, the conductive plate 410, the printed circuit board (PCB) 340, the first support member 311, and/or a housing 400.

According to an embodiment, the housing 400 may include the housing 210 illustrated in FIG. 2A and/or the side member 310 illustrated in FIG. 3.

According to an embodiment, the electronic component 405 may be disposed on one side of the PCB 340 (e.g., the second PCB 340b) and electrically connected to the PCB 340 (e.g., the second PCB 340b).

According to various embodiments, the electronic component 405 may include a speaker module, a motor, and/or a cable to cable (CTC) connector.

According to an embodiment, the conductive plate 410 may be disposed in one direction (e.g., the negative z-axis direction) of the electronic component 405, be electrically connected to the processor 120 and/or the wireless communication module 192 illustrated in FIG. 1, and may operate as a first antenna radiator.

According to various embodiments, the conductive plate 410 (e.g., the first antenna radiator) may be electrically connected to the second PCB 340b by using a first connecting member 401 (e.g., a power feeder), and may receive a power feeding signal for transmission/reception of a wireless signal from the processor 120 and/or the wireless communication module 192 disposed on the first PCB 340a.

According to an embodiment, the first support member 311 may be disposed across the inside of the housing 400. The first support member 311 may be disposed inside the housing 400. The first support member 311 may be disposed inside the electronic device 300 and either connected to the housing 400 or integrally formed with the housing 400. The first support member 311 may include, for example, a metal material and/or a non-metal material (e.g., a polymer). In an embodiment, a display (e.g., the display 330 in FIG. 3) may be disposed on a first surface (e.g., in the z-axis direction) of the first support member 311. In an embodiment, the PCB 340 may be disposed on a second surface (e.g., in the negative z-axis direction) of the first support member 311. In an embodiment, the PCB 340 may include the first PCB 340a and/or the second PCB 340b.

According to an embodiment, the housing 400 may form at least a part of the exterior of the electronic device 300. The housing 400 may include at least one conductive portion (e.g., the first conductive portion 420 and/or the second conductive portion 430). In an embodiment, the housing 400 may include the first conductive portion 420 formed between the first segmenting part 421 and the second segmenting part 422. In another example, the housing 400 may include the second conductive portion 430 formed between the first segmenting part 421 and the third segmenting part 433.

According to an embodiment, the first conductive portion 420 physically separated by the first and second segmenting parts 421 and 422 of the housing 400 may be electrically connected, using a second connecting member 402 (e.g., a ground contact), to the conductive plate 410 (e.g., the first antenna radiator) and may operate as a second antenna radiator.

According to various embodiments, using the conductive plate 410 as the first antenna radiator and using the first conductive portion 420 formed in a portion of the housing 400 as the second antenna radiator, the electronic device 300 according to various embodiments of the disclosure can realize broadband radiation characteristics.

With reference to FIG. 4C, in the electronic device 300, heat generated from the electronic component 405 (e.g., the speaker module) may be transferred to the conductive plate 410 disposed in one direction (e.g., the negative z-axis direction). The heat transferred to the conductive plate 410 is then transferred to the first conductive portion 420 of the housing 400 electrically connected to the conductive plate 410 through the second connecting member 402 and dissipated to the outside of the electronic device 300.

Figure 5:
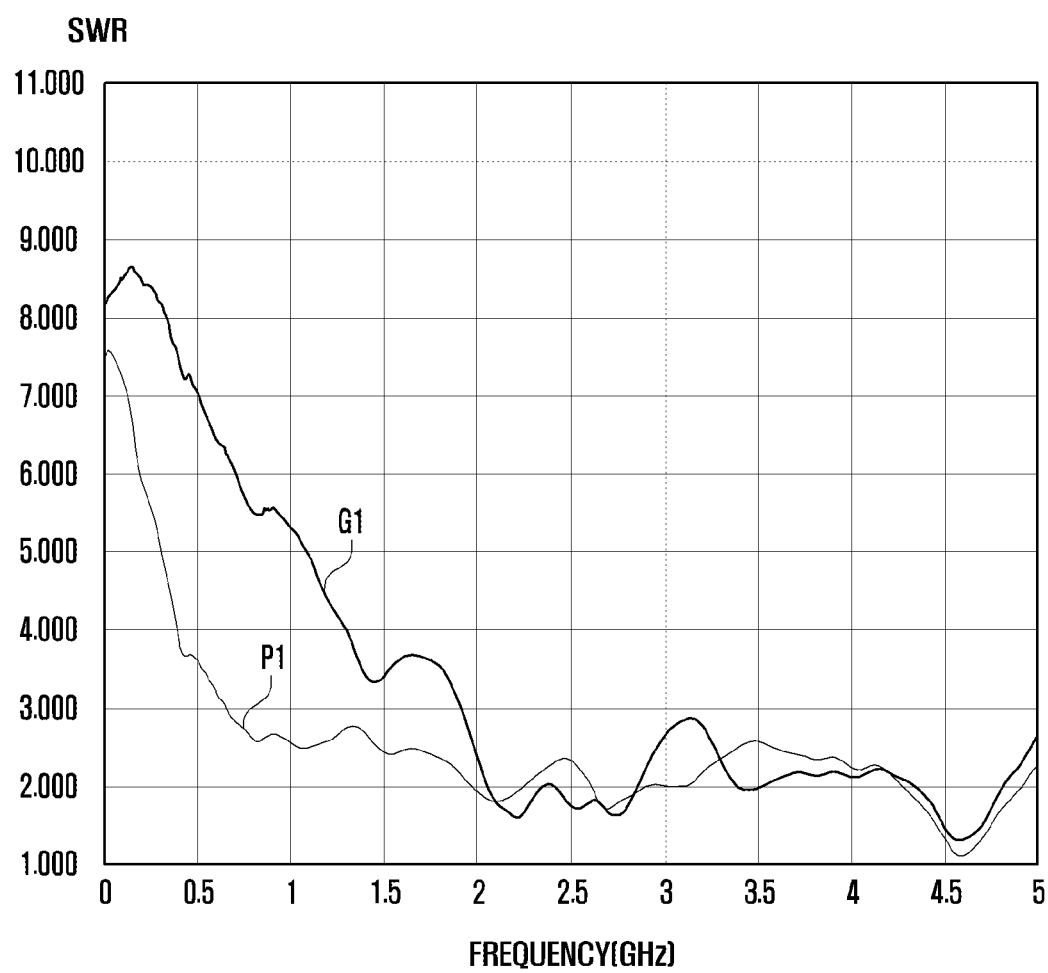
FIG. 5 is a diagram illustrating radiation performance of an example electronic device according to various embodiments and an electronic device according to a comparative example.

FIG. 5 is a diagram illustrating radiation performance of an example electronic device according to various embodiments and an electronic device according to a comparative example.

According to various embodiments, the electronic device 300 according to various embodiments of the disclosure may use the conductive plate 410 as the first antenna radiator and use at least one conductive portion (e.g., the first conductive portion 420 and/or the second conductive portion 430) formed in a part of the housing 400 as the second antenna radiator.

According to various embodiments, the electronic device according to the comparative example may use only either the conductive plate 410 or the first conductive portion 420 as an antenna radiator.

With reference to FIG. 5, the closer the standing wave radio (SWR) is to about 1 (e.g., about 3 or less), the better the radiation performance. It can be seen that, compared to the radiation performance G1 of the comparative example in which only either the conductive plate 410 or the first conductive portion 420 is used as an antenna radiator, the radiation performance P1 of the electronic device 300 according to various embodiments of the disclosure in which the conductive plate 410 (e.g., the first antenna radiator) and the at least one conductive portion (e.g., the second antenna radiator) (e.g., the first conductive portion 420 and/or the second conductive portion 430) are used as antenna radiators exhibits broadband characteristics.

According to an embodiment, it can be seen that, compared to the radiation performance G1 of the electronic device according to the comparative example, the radiation performance P1 of the electronic device 300 according to various embodiments of the disclosure is closer to the SWR of about 1 in frequency bands of, for example, about 0.7 GHz to 2.1 GHZ, about 2.8 GHz to 3.3 GHZ, and about 4.3 GHZ to 5.0 GHz.

Figure 6A:
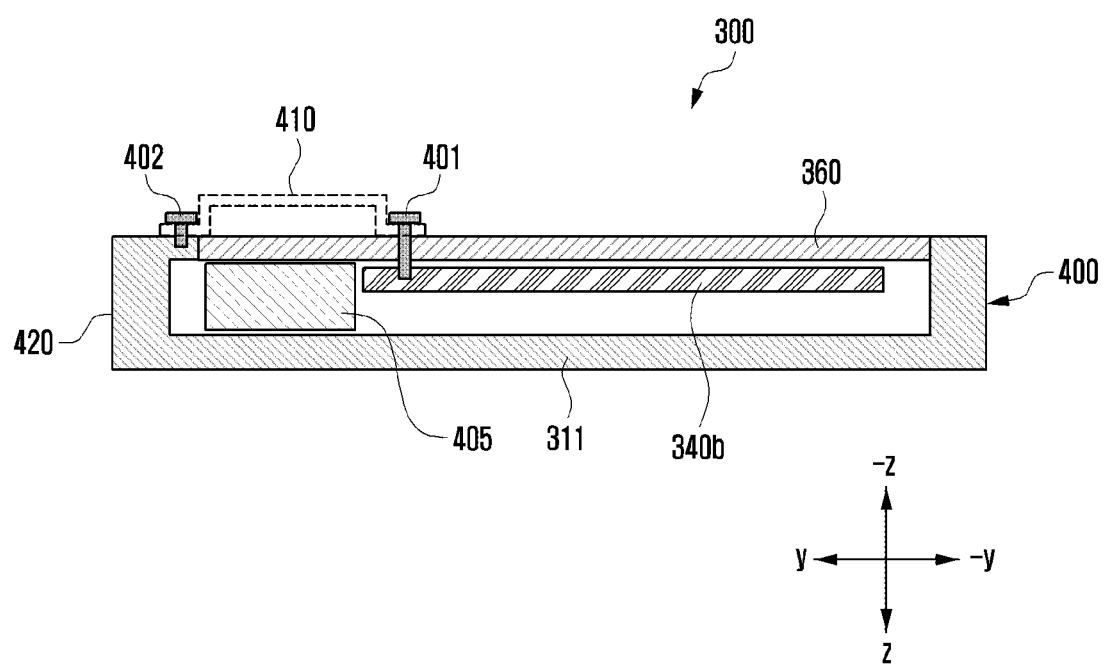
FIG. 6A is a diagram schematically illustrating a cross-section, as viewed from one direction, of a part C of the example electronic device illustrated in FIG. 4A according to various embodiments.

FIG. 6A is a diagram schematically illustrating a cross-section, as viewed from one direction (e.g., the negative x-axis direction), of a part C of the example electronic device illustrated in FIG. 4A according to various embodiments.

According to various embodiments, FIGS. 6A, 6B, 6C, and 6D are cross-sectional views showing a state in which the housing 400, electronic component 405, and conductive plate 410 of the electronic device 300 illustrated in FIG. 4A and the second support member 360 illustrated in FIG. 3 are combined.

In the following description of the drawings, the same reference numerals are assigned to components substantially identical with those of the electronic device 300 illustrated in FIGS. 3, 4A, 4B, and 4C, and repeated descriptions may be omitted.

With reference to FIG. 6A, in the electronic device 300 according to various embodiments of the disclosure, the electronic component 405 (e.g., the speaker module) may be disposed in a first direction (e.g., the z-axis direction) of the second support member 360. In an embodiment, the electronic component 405 may be positioned on one side (e.g., in the y-axis direction) of the PCB 340 (e.g., the second PCB 340b).

According to an embodiment, the conductive plate 410 supporting the electronic component 405 may be disposed in a second direction (e.g., the negative z-axis direction) of the second support member 360 opposite to the first direction (e.g., the z-axis direction). A first portion (e.g., in the negative y-axis direction) of the conductive plate 410 may be electrically connected to the second PCB 340b through the first connecting member 401. For example, the first connecting member 401 may pass through the second support member 360 and electrically connect the first portion of the conductive plate 410 and the second PCB 340b. The first connecting member 401 may include, for example, one of a screw, a conductive foam spring, or solder.

According to various embodiments, using the first connecting member 401, the conductive plate 410 may receive a power feeding signal for transmission/reception of a wireless signal from the processor 120 and/or the wireless communication module 192 shown in FIG. 1. The conductive plate 410 may operate as the first antenna radiator.

According to various embodiments, a second portion (e.g., in the y-axis direction) of the conductive plate 410 may be electrically connected to the first conductive portion 420 formed in the housing 400 through the second connecting member 402. The first conductive portion 420 may operate as the second antenna radiator. The second connecting member 402 may include, for example, one of a screw, a conductive foam spring, or solder.

Figure 6B:
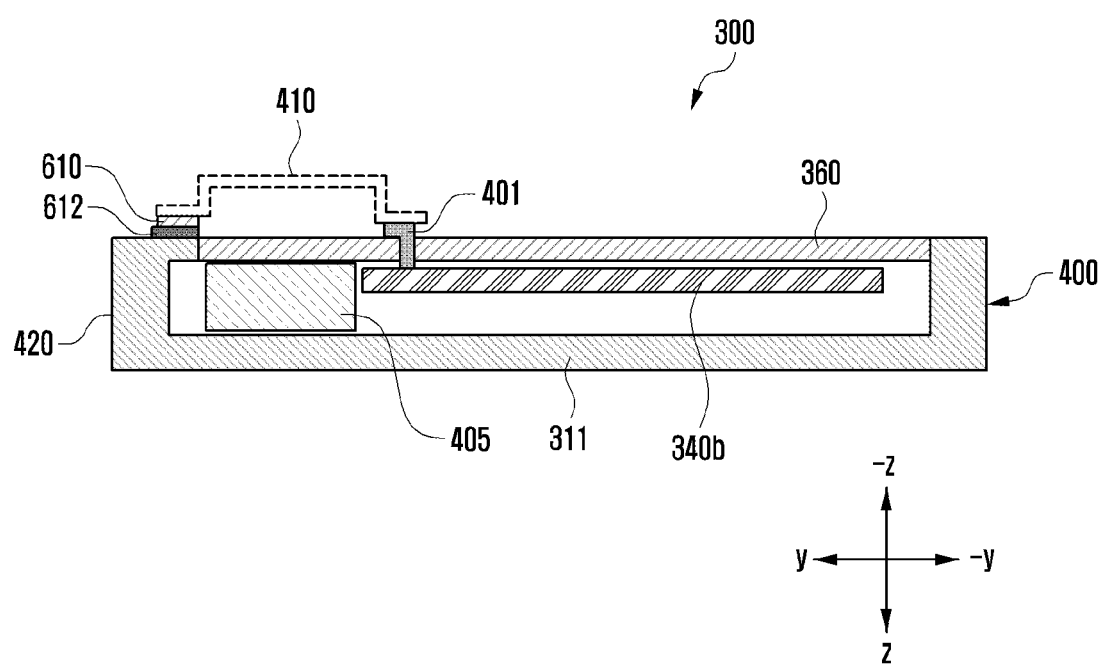
FIG. 6B is a diagram schematically illustrating a cross-section, as viewed from one direction, of a part C of the example electronic device illustrated in FIG. 4A according to various embodiments.

FIG. 6B is a diagram schematically illustrating a cross-section, as viewed from one direction (e.g., the negative x-axis direction), of a part C of the example electronic device illustrated in FIG. 4A according to various embodiments.

With reference to FIG. 6B, in the electronic device 300 according to various embodiments of the disclosure, the electronic component 405 (e.g., the speaker module) may be disposed in the first direction (e.g., the z-axis direction) of the second support member 360 (e.g., a non-conductive material). In an embodiment, the electronic component 405 may be positioned on one side (e.g., in the y-axis direction) of the PCB 340 (e.g., the second PCB 340b).

According to an embodiment, the conductive plate 410 supporting the electronic component 405 may be disposed in the second direction (e.g., the negative z-axis direction) of the second support member 360 opposite to the first direction (e.g., the z-axis direction). The first portion (e.g., in the negative y-axis direction) of the conductive plate 410 may be electrically connected to the second PCB 340b through the first connecting member 401. The first connecting member 401 may pass through the second support member 360 and electrically connect the first portion of the conductive plate 410 and the second PCB 340b. The first connecting member 401 may include, for example, a C-clip.

According to various embodiments, the second portion (e.g., in the y-axis direction) of the conductive plate 410 may be combined with the conductive portion 420 through a non-conductive member 610 and a conductive member 612. The second portion of the conductive plate 410 may make coupling with the conductive member 612 with the non-conductive member 610 interposed therebetween. In an embodiment, in order to increase the coupling between the second portion of the conductive plate 410 and the conductive member 612, the non-conductive member 610 may be formed to a thickness of about 0.1 mm to 1 mm. The non-conductive member 610 may include, for example, a non-conductive tape.

According to an embodiment, if the second portion of the conductive plate 410 can make coupling with the first conductive portion 420, the conductive member 612 may be omitted.

Figure 6C:
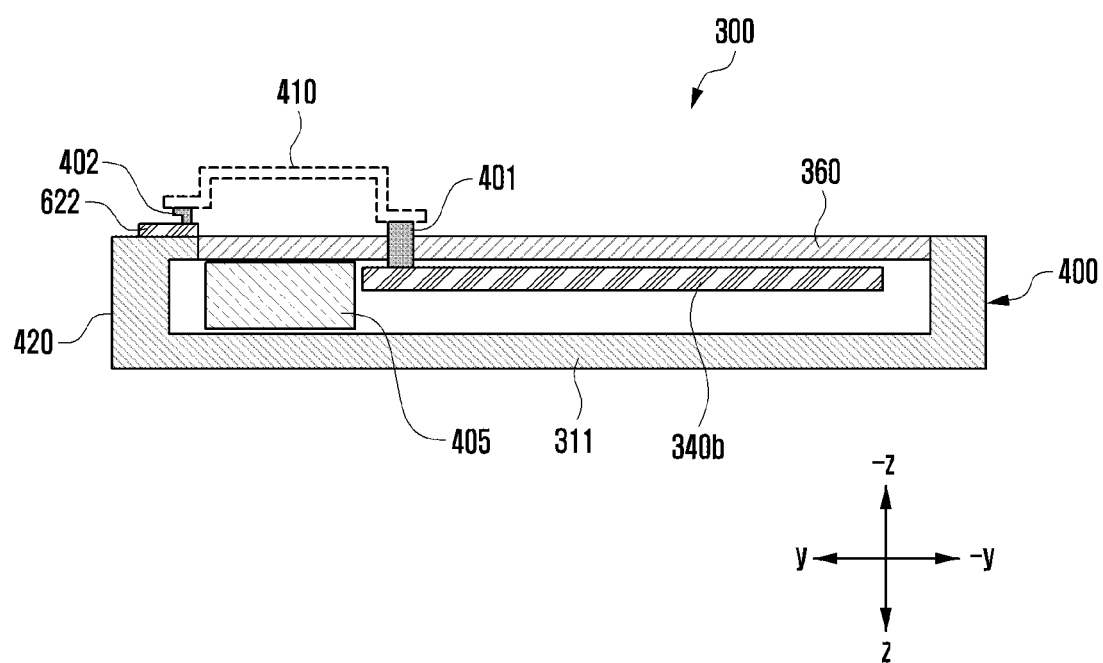
FIG. 6C is a diagram schematically illustrating a cross-section, as viewed from one direction, of a part C of the example electronic device illustrated in FIG. 4A according to various embodiments.

FIG. 6C is a diagram schematically illustrating a cross-section, as viewed from one direction (e.g., the negative x-axis direction), of a part C of the example electronic device illustrated in FIG. 4A according to various embodiments.

With reference to FIG. 6C, in the electronic device 300 according to various embodiments of the disclosure, the electronic component 405 (e.g., the speaker module) may be disposed in the first direction (e.g., the z-axis direction) of the second support member 360 (e.g., a non-conductive material). In an embodiment, the electronic component 405 may be positioned on one side (e.g., in the y-axis direction) of the PCB 340 (e.g., the second PCB 340b).

According to an embodiment, the conductive plate 410 supporting the electronic component 405 may be disposed in the second direction (e.g., the negative z-axis direction) of the second support member 360 opposite to the first direction (e.g., the z-axis direction). The first portion (e.g., in the negative y-axis direction) of the conductive plate 410 may be electrically connected to the second PCB 340b through the first connecting member 401. The first connecting member 401 may pass through the second support member 360 and electrically connect the first portion of the conductive plate 410 and the second PCB 340b. The first connecting member 401 may include, for example, a conductive tape having elasticity.

According to various embodiments, the second portion (e.g., in the y-axis direction) of the conductive plate 410 may be electrically connected to the first conductive portion 420 through the second connecting member 402 (e.g., a C clip) and a third PCB 622. The third PCB 622 may be electrically connected to the first conductive portion 420 by using a third connecting member (e.g., the third connecting member 710 in FIG. 7). The third PCB 622 may include a matching element capable of adjusting the time constant of the conductive plate 410 (e.g., the first antenna radiator) and the first conductive portion 420 (e.g., the second antenna radiator).

Figure 6D:
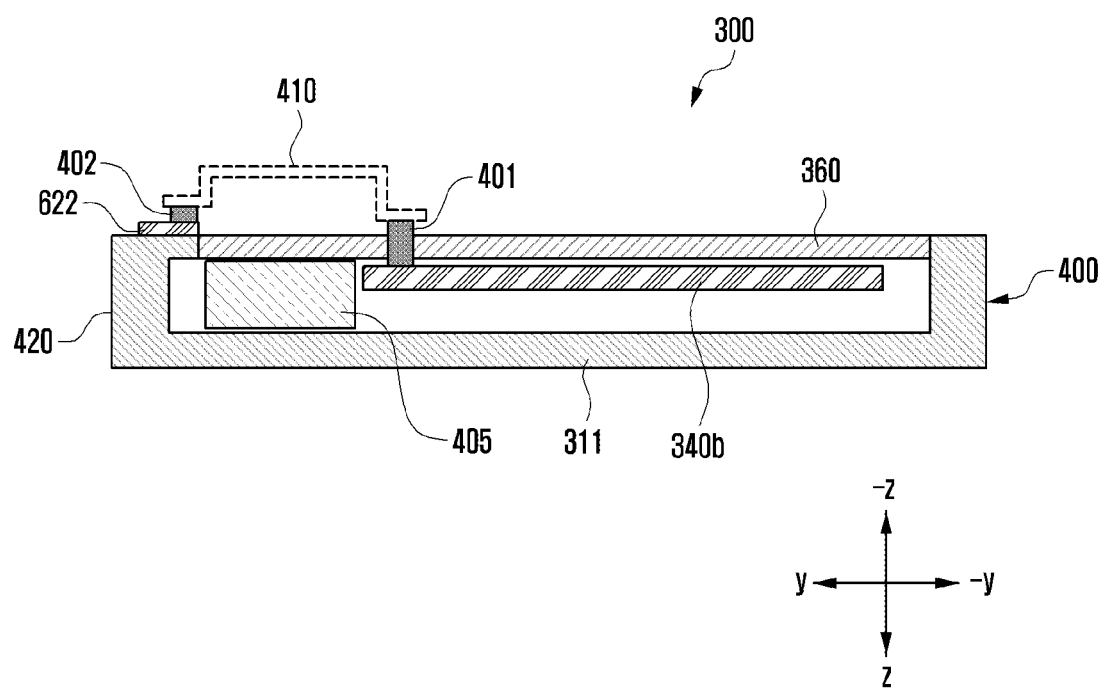
FIG. 6D is a diagram schematically illustrating a cross-section, as viewed from one direction, of a part C of the example electronic device illustrated in FIG. 4A according to various embodiments.
Figure 7:
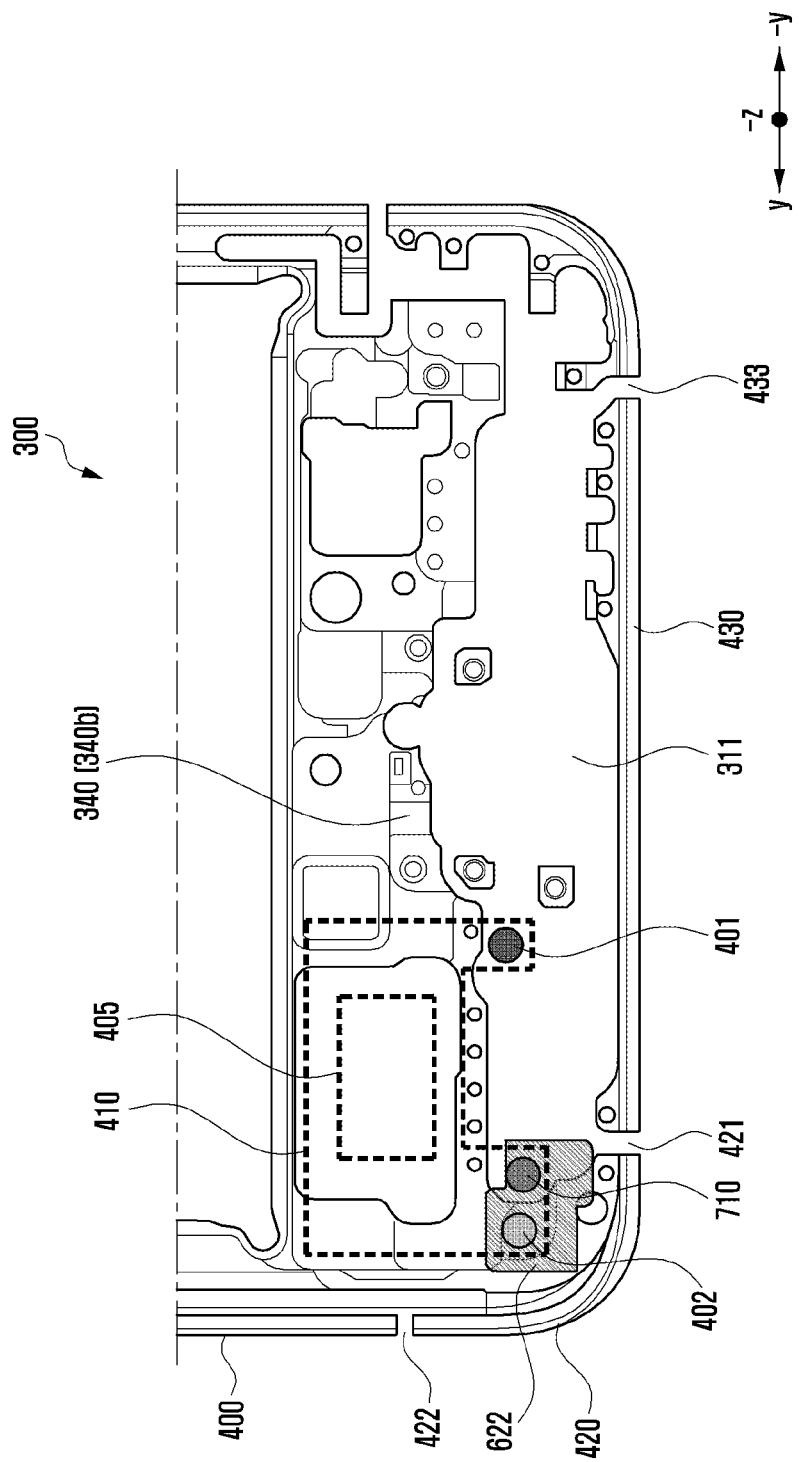
FIG. 7 is a diagram illustrating a state in which a third PCB is disposed in a housing of an example electronic device according to various embodiments.

FIG. 6D is a diagram schematically illustrating a cross-section, as viewed from one direction (e.g., the negative x-axis direction), of a part C of the example electronic device illustrated in FIG. 4A according to various embodiments of the disclosure. FIG. 7 is a diagram illustrating a state in which a third PCB is disposed in a housing of an electronic device according to various embodiments.

According to an embodiment, FIG. 7 is a diagram, as viewed from one direction (e.g., the negative z-axis direction), of various embodiments of the part A of the electronic device illustrated in FIG. 3 according to various embodiments of the disclosure.

With reference to FIGS. 6D and 7, in the electronic device 300 according to various embodiments of the disclosure, the electronic component 405 (e.g., the speaker module) may be disposed in the first direction (e.g., the z-axis direction) of the second support member 360 (e.g., a non-conductive material). In an embodiment, the electronic component 405 may be positioned on one side (e.g., in the y-axis direction) of the PCB 340 (e.g., the second PCB 340b).

According to an embodiment, the conductive plate 410 supporting the electronic component 405 may be disposed in the second direction (e.g., the negative z-axis direction) of the second support member 360 opposite to the first direction (e.g., the z-axis direction). The first portion (e.g., in the negative y-axis direction) of the conductive plate 410 may be electrically connected to the second PCB 340b through the first connecting member 401. The first connecting member 401 may pass through the second support member 360 and electrically connect the first portion of the conductive plate 410 and the second PCB 340b. The first connecting member 401 may include, for example, a conductive tape.

According to various embodiments, the second portion (e.g., in the y-axis direction) of the conductive plate 410 may be electrically connected to the first conductive portion 420 through the second connecting member 402 (e.g., a conductive tape) and the third PCB 622. The third PCB 622 may be electrically connected to the first conductive portion 420 using the third connecting member 710. The third connecting member 710 may include, for example, soldering or a conductive tape.

Figure 8:
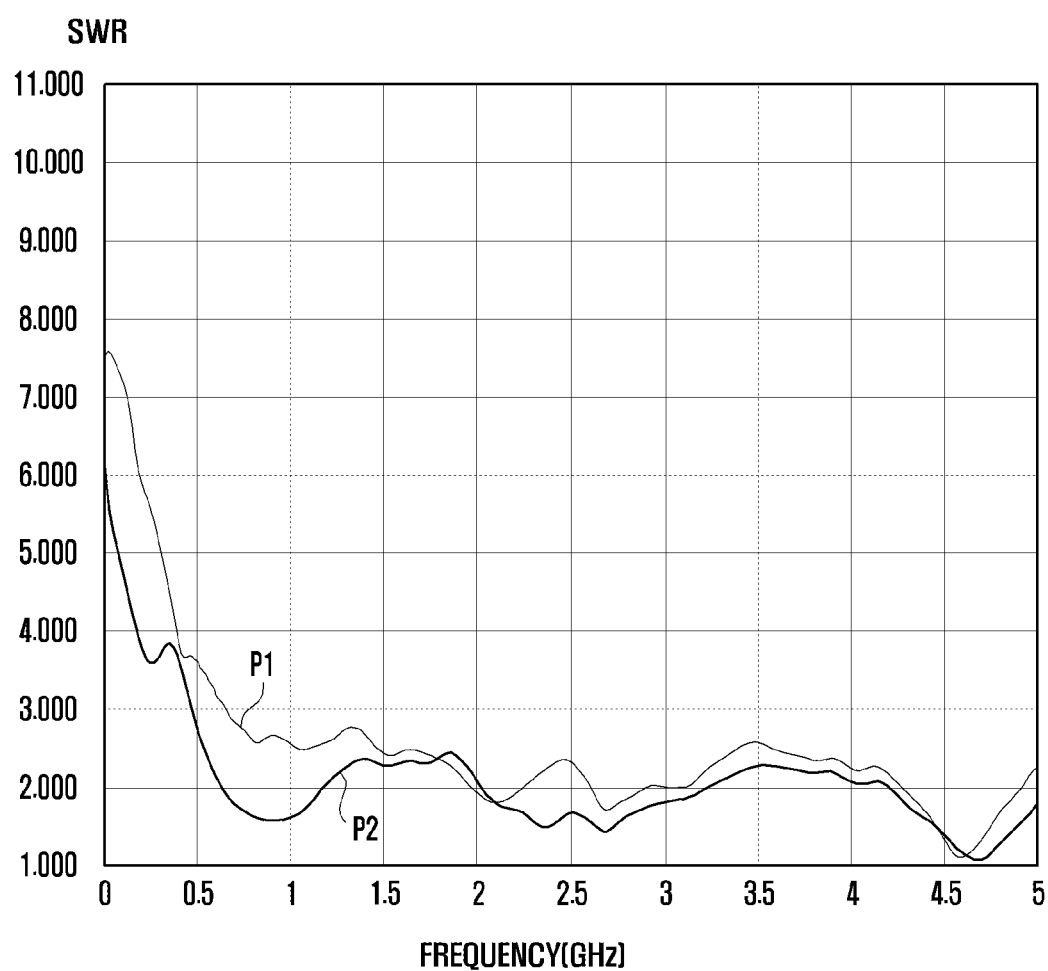
FIG. 8 is a diagram illustrating radiation performance of an example electronic device including a third PCB and the example electronic device illustrated in FIGS. 4A, 4B, and 4C according to various embodiments.

FIG. 8 is a diagram illustrating radiation performance of an electronic device including a third PCB and the electronic device illustrated in FIGS. 4A to 4C according to various embodiments of the disclosure.

According to various embodiments, the electronic device 300 according to various embodiments of the disclosure may adjust the time constants of the conductive plate 410 (e.g., the first antenna radiator) and the first conductive portion 420 (e.g., the second antenna radiator) using the third PCB 622.

According to various embodiments, the electronic device of FIGS. 4A, 4B, and 4C that uses the conductive plate 410 as the first antenna radiator and uses the first conductive portion 420 as the second antenna radiator may not adjust the time constant through the third PCB 622 illustrated in the embodiment of FIG. 7.

With reference to FIG. 8, the closer the standing wave radio (SWR) is to about 1 (e.g., about 3 or less), the better the radiation performance. It can be seen that, compared to the radiation performance P1 of the embodiment (e.g., the embodiment of FIGS. 4A, 4B, and 4C) in which the conductive plate 410 and the first conductive portion 420 are used as antenna radiators and the third PCB 622 is not used to adjust the time constant, the radiation performance P2 of the electronic device 300 according to the embodiment of FIG. 7 in which the conductive plate 410 (e.g., the first antenna radiator) and the first conductive portion 420 (e.g., the second antenna radiator) are used as antenna radiators and the third PCB 622 is used to adjust the time constant is improved.

According to an embodiment, it can be seen that, compared to the radiation performance P1 of the electronic device according to the embodiment of FIGS. 4A, 4B, and 4C, the radiation performance P2 of the electronic device 300 according to the embodiment of FIG. 7 is closer to the SWR of about 1 in an overall frequency band of, for example, about 0.5 GHz to 5 GHz.

Figure 9:
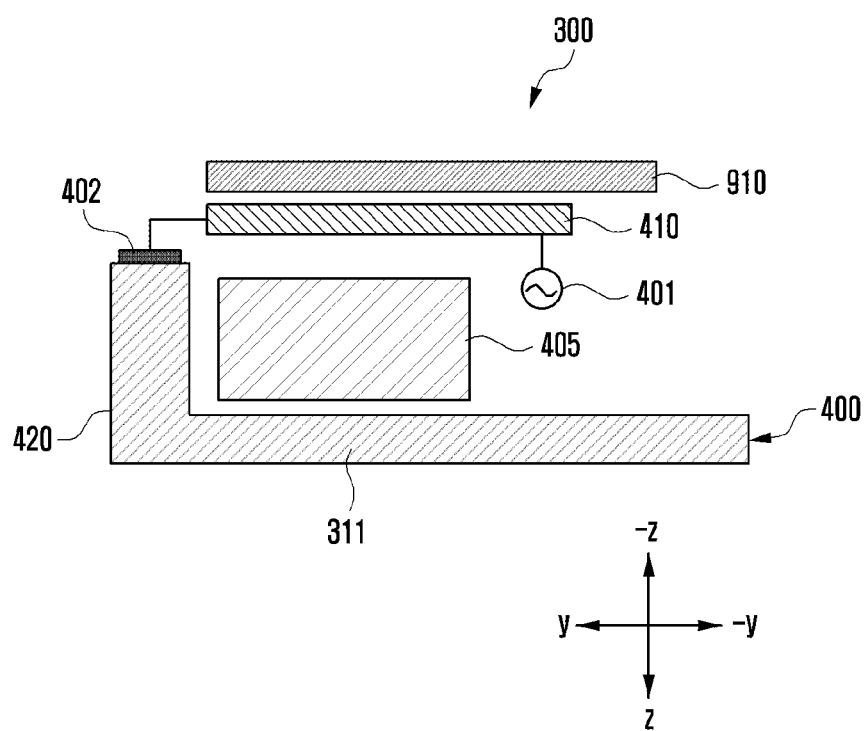
FIG. 9 is a diagram schematically illustrating a part B of the example electronic device illustrated in FIG. 4A according to various embodiments.

FIG. 9 is a diagram schematically illustrating a part B of the electronic device illustrated in FIG. 4A according to various embodiments.

With reference to FIG. 9, the electronic device 300 according to various embodiments of the disclosure may include the electronic component 405, the conductive plate 410, and/or the housing 400.

According to an embodiment, the conductive plate 410 may be disposed in one direction (e.g., the negative z-axis direction) of the electronic component 405, be electrically connected to the processor 120 and/or the wireless communication module 192 illustrated in FIG. 1, and may operate as the first antenna radiator.

According to various embodiments, the conductive plate 410 (e.g., the first antenna radiator) may be electrically connected to the PCB 340 (e.g., the second PCB 340b) through the first connecting member 401 (e.g., a power feeder).

According to an embodiment, the housing 400 may include the first conductive portion 420 formed in the side surface. The first conductive portion 420 of the housing 400 may be electrically connected to the conductive plate 410 (e.g., the first antenna radiator) through the second connecting member 402 (e.g., a ground contact), and may operate as the second antenna radiator.

According to an embodiment, a heat dissipation member 910 may be disposed in one direction (e.g., the negative z-axis direction) of the conductive plate 410. The heat dissipation member 910 may include, for example, a conductive graphite sheet. The heat dissipation member 910 may make coupling with the conductive plate 410. The heat dissipation member 910 may operate as a third radiator through coupling with the conductive plate 410. In an embodiment, a non-conductive protective film may be disposed between the heat dissipation member 910 and the conductive plate 410.

According to various embodiments, the heat dissipation member 910 may receive heat generated from the electronic component 405 (e.g., the speaker module) through the conductive plate 410 and dissipate it to the outside.

Figure 10:
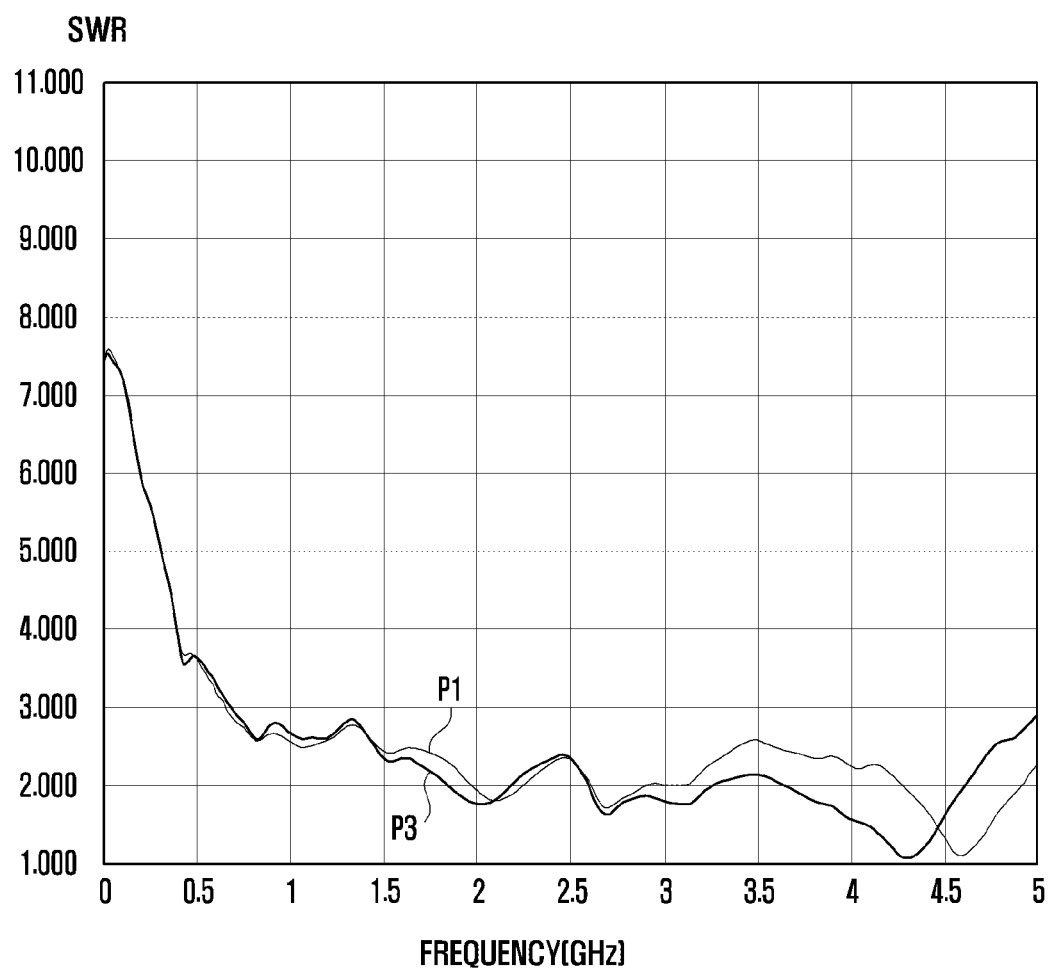
FIG. 10 is a diagram illustrating radiation performance of an example electronic device including a heat dissipation member (e.g., a third radiator) and the example electronic device illustrated in FIGS. 4A, 4B, and 4C according to various embodiments.

FIG. 10 is a diagram illustrating radiation performance of an electronic device including a heat dissipation member (e.g., a third radiator) and the electronic device illustrated in FIGS. 4A, 4B, and 4C according to various embodiments.

According to various embodiments, the electronic device 300 may use, as antenna radiators, the conductive plate 410 (e.g., the first antenna radiator), the first conductive portion 420 (e.g., the second antenna radiator), and the heat dissipation member 910 (e.g., the third antenna radiator).

According to various embodiments, the electronic device of FIGS. 4A, 4B, and 4C that uses the conductive plate 410 as the first antenna radiator and uses the first conductive portion 420 as the second antenna radiator may not include the heat dissipation member 910 shown in the embodiment of FIG. 9.

With reference to FIG. 10, the closer the standing wave radio (SWR) is to about 1 (e.g., about 3 or less), the better the radiation performance. It can be seen that, compared to the radiation performance P1 of the embodiment (e.g., the embodiment of FIGS. 4A, 4B, and 4C) in which the conductive plate 410 and the first conductive portion 420 are used as antenna radiators and the heat dissipation member 910 is not included, the radiation performance P3 of the electronic device 300 according to the embodiment of FIG. 9 in which the conductive plate 410 (e.g., the first antenna radiator), the first conductive portion 420 (e.g., the second antenna radiator), and the heat dissipation member 910 (e.g., the third antenna radiator) are used as antenna radiators is improved.

According to an embodiment, it can be seen that, compared to the radiation performance P1 of the electronic device according to the embodiment of FIGS. 4A to 4C, the radiation performance P3 of the electronic device 300 according to the embodiment of FIG. 9 is closer to the SWR of about 1 in frequency bands of, for example, about 1.5 GHz to 2.1 GHZ and about 2.8 GHz to 4.5 GHz.

Figure 11:
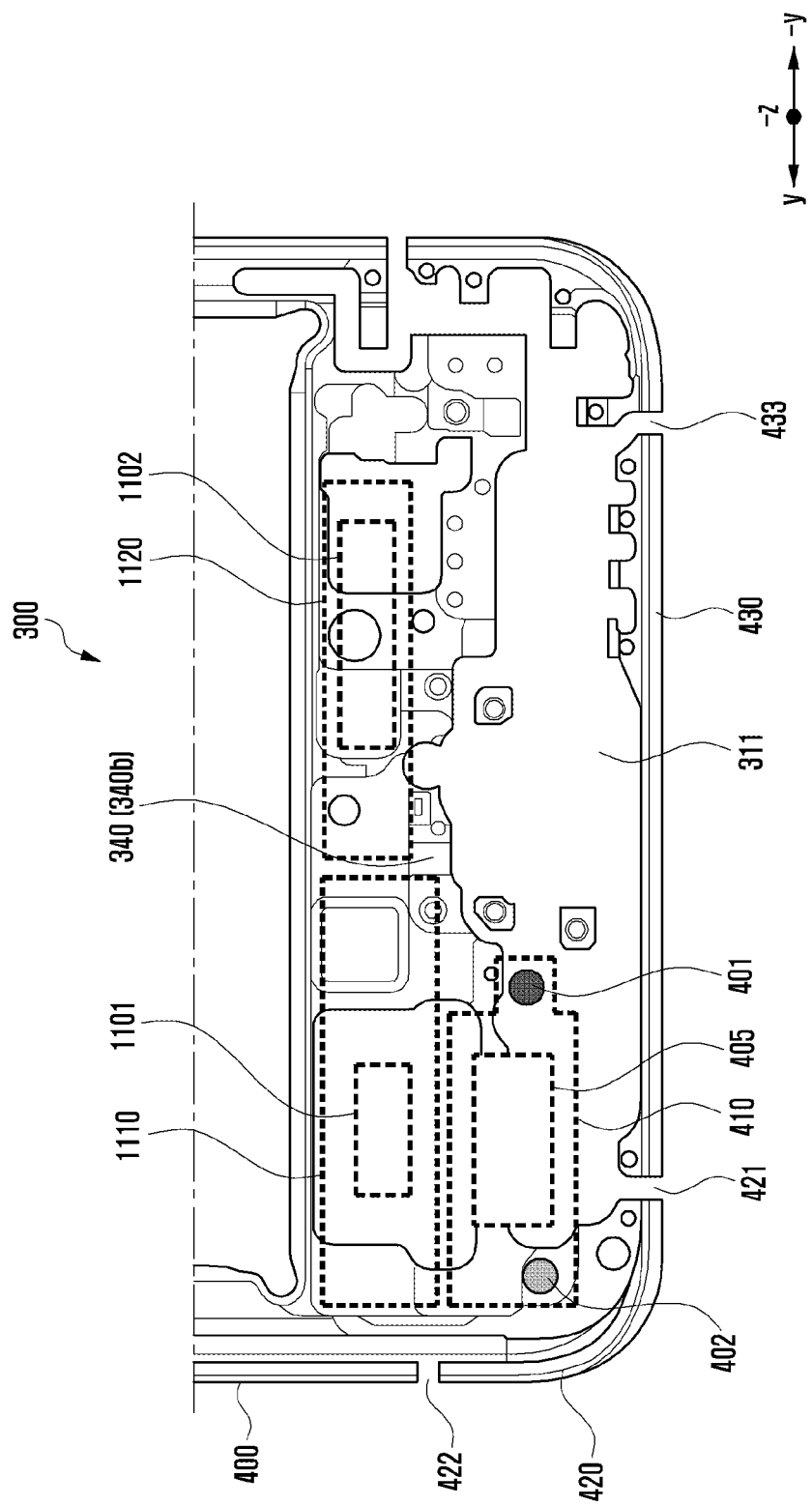
FIG. 11 is a diagram schematically showing a part A in a state in which the housing, the at least one electronic component, and the conductive plate are combined with each other in the example electronic device illustrated in FIG. 3 according to various embodiments.

FIG. 11 is a diagram schematically showing a part A in a state in which the housing, the at least one electronic component, and the conductive plate are combined with each other in the electronic device illustrated in FIG. 3 according to various embodiments.

According to an embodiment, FIG. 11 is a diagram, as viewed from one direction (e.g., the negative z-axis direction), of the part A of the electronic device illustrated in FIG. 3 in a state in which the housing, the at least one electronic component, and the conductive plate are combined. In the description of FIG. 11, the description substantially the same as that of the electronic device 300 illustrated in FIGS. 3 and 4A, 4B, and 4C will be not be repeated here.

According to the above-described various embodiments, the electronic device 300 may use the conductive plate 410 supporting the electronic component 405 (e.g., the speaker module) as the first antenna radiator.

According to various embodiments, the electronic device 300 may use a first conductive support plate 1110 supporting a first electronic component 1101 (e.g., a motor) as an additional antenna radiator. The first conductive support plate 1110 supporting the first electronic component 1101 may be electrically connected to the PCB 340 (e.g., the second PCB 340) through the above-described first connecting member 401, for example. The first conductive support plate 1110 may be electrically connected to the first conductive portion 420 through the second connecting member 402.

According to various embodiments, the electronic device 300 may also use a second conductive support plate 1120 supporting a second electronic component 1102 (e.g., a cable to cable (CTC) connector) as an additional antenna radiator. The second conductive support plate 1120 supporting the second electronic component 1102 may be electrically connected to the PCB 340 (e.g., the second PCB 340) through the above-described first connecting member 401, for example. The second conductive support plate 1120 may be electrically connected to the first conductive portion 420 through the second connecting member 402.

An electronic device 300 according to various embodiments of the disclosure may include a housing 400 including a first conductive portion 420, a first support member 311 disposed inside the housing 400, a printed circuit board 340 disposed on one surface of the first support member 311 and including a wireless communication module 192, an electronic component 405 electrically connected to the printed circuit board 340, and a conductive plate 410 supporting the electronic component 405, the conductive plate 410 including a first portion electrically connected to the wireless communication module 192 and a second portion electrically connected to the first conductive portion 420.

According to various embodiments, the first portion of the conductive plate 410 may be electrically connected to the printed circuit board 340 through a first connecting member 401, and the second portion may be electrically connected to the first conductive portion 420 through a second connecting member 402.

According to various embodiments, the conductive plate 410 may operate as a first antenna radiator, and the first conductive portion 420 may operate as a second antenna radiator.

According to various embodiments, the electronic component 405 may include one of a speaker module, a motor, or a cable to cable (CTC) connector.

According to various embodiments, heat generated from the electronic component 405 may be dissipated to outside the electronic device through the conductive plate 410 and the first conductive portion 420.

According to various embodiments, the first connecting member 401 may include one of a screw, a conductive foam spring, solder, a C clip, or a conductive tape.

According to various embodiments, the second portion of the conductive plate 410 may be configured to be combined with the first conductive portion 420 through a non-conductive member 610 and a conductive member 612.

According to various embodiments, the second portion may couple with the conductive member 612 with the non-conductive member 610 therebetween.

According to various embodiment, the second portion of the conductive plate 410 may be electrically connected to the first conductive portion 420 through a second connecting member 402 and a third PCB 622.

According to various embodiment, the third PCB 622 may be configured to adjust a time constant of the conductive plate 410 and the first conductive portion 420.

According to various embodiments, the third PCB 622 may be electrically connected to the first conductive portion 420 through a third connecting member 710.

According to various embodiments, the electronic device 300 may further include a heat dissipation member 910 disposed in one direction of the conductive plate 420 and operating as a third antenna radiator by coupling with the conductive plate 420.

According to various embodiments, the first conductive portion 420 may be formed between a first segmenting part 421 and a second segmenting part 422 of the housing 400.

According to various embodiments, the heat dissipation member 910 may include a conductive graphite sheet.

According to various embodiments, the heat dissipation member 910 may be configured to receive heat generated from the electronic component 405 through the conductive plate 410 and dissipate the heat to outside the electronic device.

An electronic device 300 according to various embodiments of the disclosure may include a housing 400, a printed circuit board 340 disposed inside the housing 400 and including a wireless communication module 192, an electronic component 405 electrically connected to the printed circuit board 340, and a conductive plate 410 supporting the electronic component 405, the conductive plate 410 being configured such that a first portion is electrically connected to the wireless communication module 192.

According to various embodiments, the housing 400 may include a first conductive portion 420 separated by a first segmenting part 421 and a second segmenting part 422 formed in at least a part of a side surface, and a second portion of the conductive plate 410 may be electrically connected to the first conductive portion 420.

According to various embodiments, the first portion of the conductive plate 410 may be electrically connected to the printed circuit board 340 through a first connecting member 401, and the second portion may be electrically connected to the first conductive portion 420 through a second connecting member 402.

According to various embodiments, the electronic device 300 may further include a heat dissipation member 910 disposed in one direction of the conductive plate 410 and coupled with the conductive plate 410.

According to various embodiments, the heat dissipation member 910 may be configured to receive heat generated from the electronic component 405 through the conductive plate 410 and dissipate the heat to outside the electronic device.

Hereinbefore, various embodiments of the disclosure have been described by way of example, but the disclosure includes all changes and modifications by those of ordinary skill in the art to which the disclosure pertains without departing from the subject matter of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first conductive portion;
   a first support member disposed inside the housing;
   a printed circuit board disposed on one surface of the first support member and including a wireless communication module;
   an electronic component electrically connected to the printed circuit board;
   a conductive plate supporting the electronic component, the conductive plate including a first portion electrically connected to the wireless communication module and a second portion electrically connected to the first conductive portion; and
   a heat dissipation member disposed in one direction of the conductive plate and operating as an antenna radiator by coupling with the conductive plate.

2. The electronic device of claim 1, wherein the first portion of the conductive plate is electrically connected to the printed circuit board through a first connecting member, and the second portion is electrically connected to the first conductive portion through a second connecting member.

3. The electronic device of claim 2, wherein the first connecting member includes one of a screw, a conductive foam spring, solder, a C clip, or a conductive tape.

4. The electronic device of claim 1, wherein the conductive plate operates as a first antenna radiator, and the first conductive portion is configured to operate as a second antenna radiator.

5. The electronic device of claim 1, wherein the electronic component includes one of a speaker module, a motor, or a cable to cable (CTC) connector.

6. The electronic device of claim 1, wherein heat generated from the electronic component is dissipated to outside the electronic device through the conductive plate and the first conductive portion.

7. The electronic device of claim 1, wherein the second portion of the conductive plate is configured to be combined with the first conductive portion through a non-conductive member and a conductive member.

8. The electronic device of claim 7, wherein the second portion is configured to couple with the conductive member with the non-conductive member therebetween.

9. The electronic device of claim 1, wherein the second portion of the conductive plate is electrically connected to the first conductive portion through a second connecting member and a third PCB.

10. The electronic device of claim 9, wherein the third PCB is configured to adjust a time constant of the conductive plate and the first conductive portion.

11. The electronic device of claim 9, wherein the third PCB is electrically connected to the first conductive portion through a third connecting member.

12. The electronic device of claim 1, wherein the first conductive portion is formed between a first segmenting part and a second segmenting part of the housing.

13. The electronic device of claim 1, wherein the heat dissipation member includes a conductive graphite sheet.

14. The electronic device of claim 1, wherein the heat dissipation member is configured to receive heat generated from the electronic component through the conductive plate and dissipate the heat to outside the electronic device.

15. An electronic device comprising:
   a housing;
   a printed circuit board disposed inside the housing and including a wireless communication module;
   an electronic component electrically connected to the printed circuit board;
   a conductive plate supporting the electronic component, the conductive plate including a first portion electrically connected to the wireless communication module; and
   a heat dissipation member disposed in one direction of the conductive plate and operating as an antenna radiator by coupling with the conductive plate.

16. The electronic device of claim 15, wherein the housing includes a first conductive portion separated by a first segmenting part and a second segmenting part formed in at least a part of a side surface, and
   a second portion of the conductive plate is electrically connected to the first conductive portion.

17. The electronic device of claim 16, wherein the first portion of the conductive plate is electrically connected to the printed circuit board through a first connecting member, and the second portion is electrically connected to the first conductive portion through a second connecting member.

18. The electronic device of claim 15, wherein the heat dissipation member is configured to receive heat generated from the electronic component through the conductive plate and dissipate the heat to outside the electronic device.

* * * * *